(12) United States Patent
Solazzi et al.

(10) Patent No.: US 11,079,295 B2
(45) Date of Patent: Aug. 3, 2021

(54) METHOD AND SYSTEM FOR DETERMINING RELIABILITY OF A PRESSURE SENSOR

(71) Applicant: Infineon Technologies AG, Neubiberg (DE)

(72) Inventors: Francesco Solazzi, Villach (AT); Martin Hassler, Villach (AT); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 171 days.

(21) Appl. No.: 16/430,051

(22) Filed: Jun. 3, 2019

(65) Prior Publication Data
US 2020/0378851 A1     Dec. 3, 2020

(51) Int. Cl.
*G01L 9/00* (2006.01)
*G01L 9/06* (2006.01)

(52) U.S. Cl.
CPC .............. *G01L 9/0052* (2013.01); *G01L 9/06* (2013.01)

(58) Field of Classification Search
CPC ... G01L 9/0042; G01L 9/0051; G01L 9/0052; G01L 9/0054; G01L 9/0055; G01L 9/06
See application file for complete search history.

(56) References Cited

U.S. PATENT DOCUMENTS

| | | | | |
|---|---|---|---|---|
| 5,528,940 A * | 6/1996 | Yamamoto | ............ | G01L 9/0054 338/42 |
| 6,422,088 B1 * | 7/2002 | Oba | ......................... | G01D 3/08 73/754 |
| 6,700,174 B1 * | 3/2004 | Miu | ...................... | G01L 9/0051 257/419 |

* cited by examiner

*Primary Examiner* — Benjamin R Schmitt
(74) *Attorney, Agent, or Firm* — Harrity & Harrity, LLP

(57) ABSTRACT

A pressure sensor is configured to monitor a first resistance value of a first resistor and a second resistance value of a second resistor. The first resistor and the second resistor are configured to be sensing elements of a sensing component of a pressure sensor. The pressure sensor is configured to determine, based on a difference between the first resistance value and the second resistance value satisfying a threshold, that a measurement from the sensing component is unreliable. The pressure sensor is configured to perform, based on determining that the measurement from the sensing component is unreliable, an action associated with the pressure sensor.

20 Claims, 10 Drawing Sheets

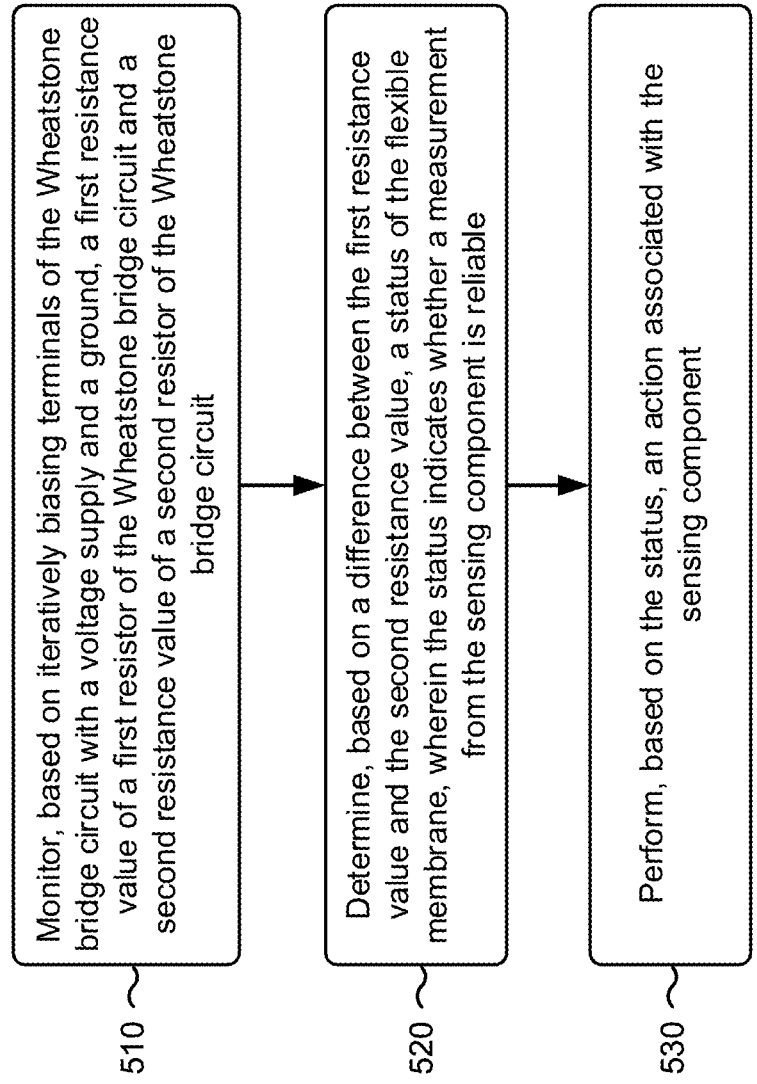

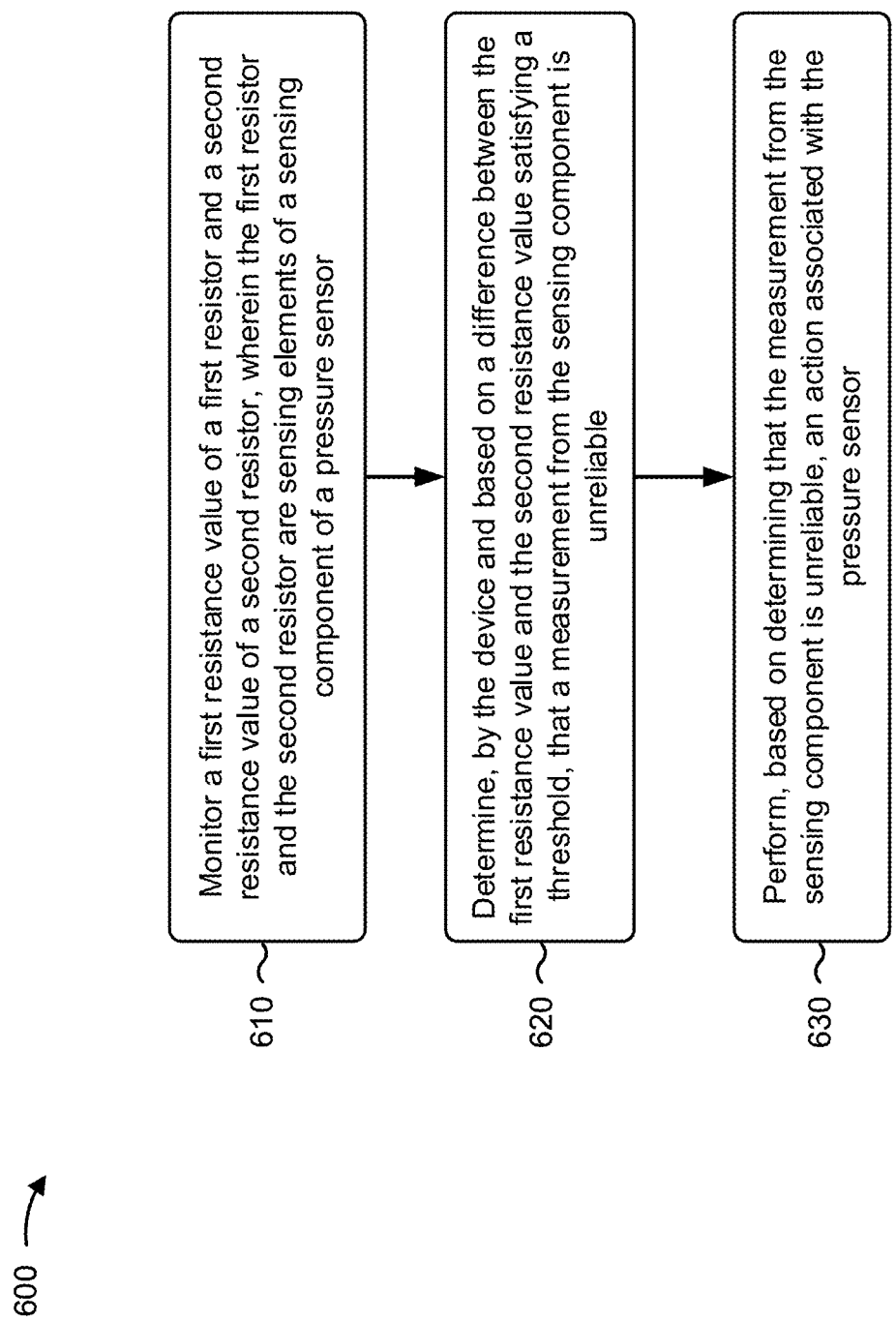

METHOD AND SYSTEM FOR DETERMINING RELIABILITY OF A PRESSURE SENSOR

BACKGROUND

A pressure sensor is a device capable of sensing an amount of pressure and providing a signal that represents the sensed amount of pressure. The pressure sensor may be, for example, a micro-electro-mechanical system (MEMS) sensor that includes a pressure-sensitive mechanical structure in the form of a flexible membrane. The membrane is coupled to an electrical transducer system (e.g., based on capacitance-detection or piezoresistance) in order to provide the pressure sensing functionality.

SUMMARY

According to some implementations, a pressure sensor may include one or more memories; and one or more processors, communicatively coupled to the one or more memories, to: receive a measurement from a sensing component, wherein the sensing component includes a first resistor and a second resistor; determine a first resistance value of the first resistor and a second resistance value of the second resistor; determine, based on a difference between the first resistance value and the second resistance value, a probability that the measurement is reliable; and perform, based on the probability that the measurement is reliable, an action associated with the measurement or the pressure sensor.

According to some implementations, a system may include a sensing component comprising: a flexible membrane and a Wheatstone bridge circuit; and a sensor controller configured to: monitor, based on iteratively biasing terminals of the Wheatstone bridge circuit with a voltage supply and a ground, a first resistance value of a first resistor of the Wheatstone bridge circuit and a second resistance value of a second resistor of the Wheatstone bridge circuit; determine, based on a difference between the first resistance value and the second resistance value, a status of the flexible membrane, wherein the status indicates whether a measurement from the sensing component is reliable; and perform, based on the status, an action associated with the sensing component.

According to some implementations, a method may include monitoring a first resistance value of a first resistor and a second resistance value of a second resistor, wherein the first resistor and the second resistor are sensing components of a sensing component of a pressure sensor; determining, based on a difference between the first resistance value and the second resistance value satisfying a threshold, that a measurement from the sensing component is unreliable; and performing, based on determining that the measurement from the sensing component is unreliable, an action associated with the pressure sensor.

BRIEF DESCRIPTION OF THE DRAWINGS

FIGS. 4-6 are flowcharts of example processes for determining reliability of a pressure sensor.

DETAILED DESCRIPTION

Figure 1A:
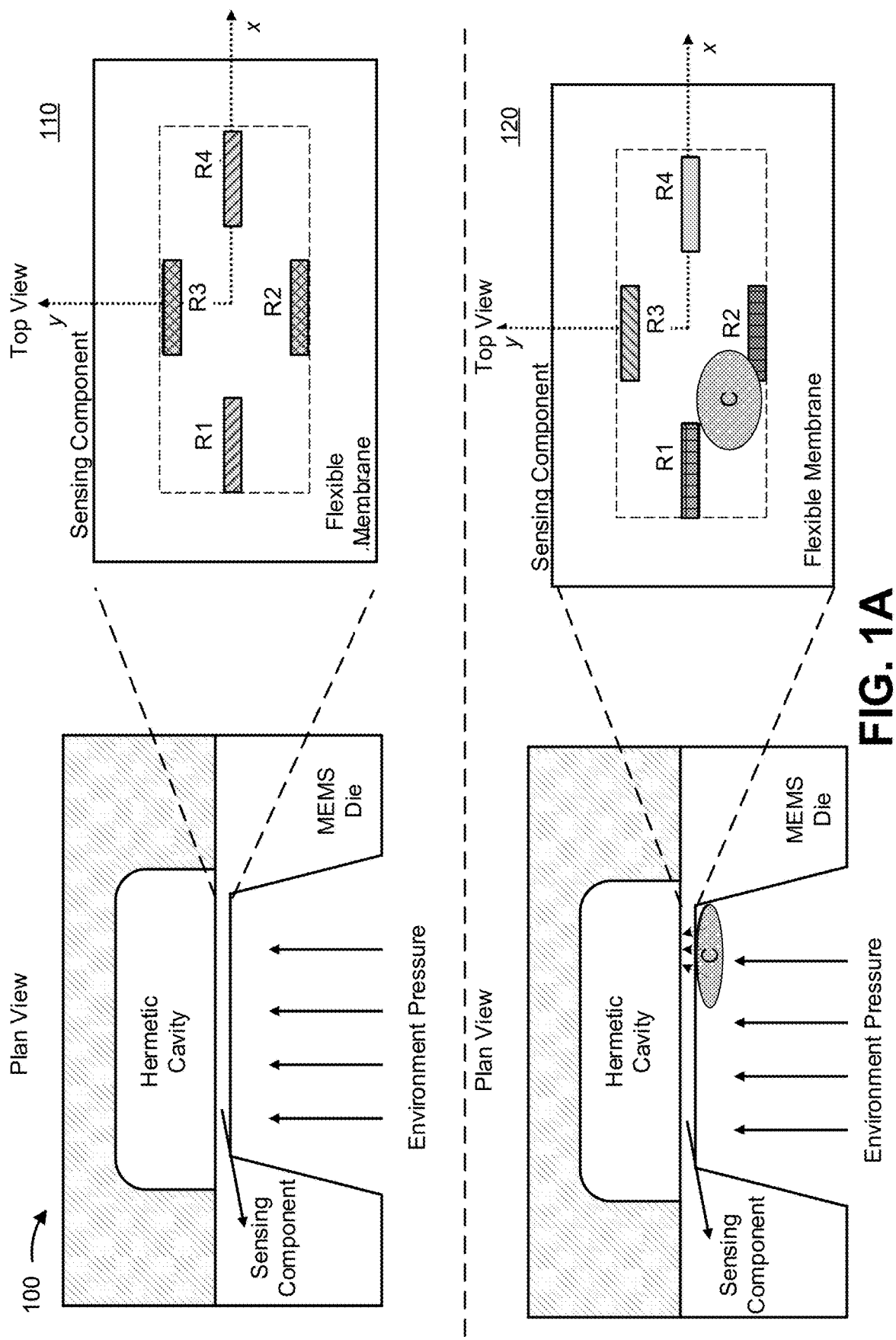
FIGS. 1A-1E are diagrams of one or more example implementations described herein.

The following detailed description of example implementations refers to the accompanying drawings. The same reference numbers in different drawings may identify the same or similar elements.

A pressure-sensitive mechanical structure of a micro-electro-mechanical system (MEMS) pressure sensor (e.g., with a flexible membrane) is typically exposed to an environment since air (or another substance) must be able to interact with a pressure-sensitive mechanical structure in order for the pressure sensor to perform pressure sensing associated with the environment. However, in some applications, the environment includes matter that causes adverse effects on accuracy and reliability of the pressure sensor. For example, the environment can include a contaminant (e.g., a dirt particle, a low-viscosity liquid, and/or the like), that can contaminate the pressure-sensitive mechanical structure of the pressure sensor (e.g., due to presence or buildup of the contaminant on the pressure-sensitive mechanical structure). This contamination causes the pressure sensor to provide inaccurate and unreliable pressure measurements. Automotive applications, such as a tire pressure monitoring system (TPMS) application or an air bag sensor application, are examples of applications in which this contamination issue may arise.

Prior techniques to address contamination of a pressure sensor are designed to prevent contamination. For example, in some cases, a gel can be applied to the pressure-sensitive mechanical structure in order to attempt to prevent contamination. As another example, a contaminant reservoir can be integrated into the pressure sensor in order to attempt to prevent contamination (e.g., by capturing matter in the contaminant reservoir). However, these prior techniques are designed only to prevent contamination, and not to actually detect contamination. Therefore, if these prior techniques fail or are ineffective, contamination goes undetected. Further, these prior techniques increase cost and complexity of the pressure sensor (e.g., by requiring application of gel, by requiring inclusion of a reservoir, etc.).

Some implementations described herein provide a sensor controller of a pressure sensor that is capable of monitoring a status of the pressure sensor. For example, the status may indicate or represent whether the pressure sensor is contaminated and/or capable of providing reliable pressure measurements. In some implementations, the pressure sensor determines whether the pressure sensor is contaminated based on detecting focused pressure at certain locations of a flexible membrane of the pressure sensor, as described below. In some implementations, the sensor controller may selectively perform an action based on the status of the pressure sensor (and/or based on whether the pressure sensor is determined to be contaminated).

In this way, a sensor controller of a pressure sensor (and/or an electronic control unit (ECU) associated with the pressure sensor) may determine whether a pressure measurement of the pressure sensor is reliable and/or can be used to accurately determine a pressure of an environment (e.g., a pressure of a tire, a pressure of a room, an outdoor pressure, and/or the like). Accordingly, the pressure sensor and/or an ECU associated with the pressure sensor may not rely on an erroneous pressure measurement, which can result in damage to one or more systems that utilize the pressure measurement to perform one or more operations (e.g., control a vehicle, contain a pressure sensitive chamber or environment, detect a characteristic of an environment, and/or the like).

FIGS. 1A-1E are diagrams of an example implementation 100 described herein. In example implementation 100, a pressure sensor includes a sensing component on a MEMS die and a hermetic cavity that provides reference pressure. Further, the pressure sensor may include and/or be associated with a sensor controller communicatively coupled with the sensing component.

As described herein, the sensing component may include a flexible membrane with a plurality of resistors R1 to R4 (referred to individually as a "resistor" and collectively as "resistors"). The resistors may be situated in a pattern on or within with the flexible membrane to permit measurements associated with the resistors (e.g., voltage measurements, resistance measurements, conductance measurements, and/or the like) to be used to determine a pressure applied to the flexible membrane (which may correspond to a pressure of an environment of the pressure sensor) and/or a status of the pressure sensor (e.g., whether or not the pressure sensor is contaminated, whether or not the pressure sensor can provide a reliable measurement, and/or the like). According to some implementations, the resistors are configured in a Wheatstone bridge circuit.

As described herein, the resistors may be variable resistors that are configured to have an electrical resistance (which may be referred to herein as a "resistance" and/or a "resistance value" (e.g., a resistance value in ohms (Ω)) that is based on the flexion of the resistors and/or the flexible membrane. Accordingly, as the flexible membrane flexes, the resistance of the resistors may correspondingly change. In this way, the sensing component is configured such that pressure that is applied to or withdrawn from the flexible membrane affects the resistance of the resistors.

As shown in FIG. 1A, and by reference number 110, the sensing component of the pressure sensor receives only an environment pressure from an atmosphere of an environment that is to be measured by the pressure sensor. In other words, in this case, the sensing component is not contaminated with a contaminant. Accordingly, pressure applied to the sensing component may be relatively uniform (e.g., equally distributed) across the flexible membrane. In such instances, the resistors of the sensing component are configured on or within the flexible membrane such that the resistances of R1 and R4 (shown in FIG. 1A along an x-axis of the flexible membrane) are equal (as indicated by the shaded pattern of R2 and R3) and/or the resistances of R2 and R3 (shown in FIG. 1A along a y-axis of the flexible membrane) are relatively equal (as indicated by the shaded pattern of R2 and R3). Accordingly, when the sensor controller determines that R1 and R4 are equal and/or that R2 and R3 are equal, the sensor controller may determine that the pressure sensor (or the status of the pressure sensor) is reliable (e.g., capable of functioning as designed). Similarly, if the sensor controller determines that the ratio of R1 and R2 is similar to the ratio of R3 and R4 (and/or that the ratio of R1 and R3 is similar to the ratio of R2 and R4), the sensor controller may determine that the pressure sensor is reliable. As used herein, resistances (or ratios of resistances) may be considered "equal" when a difference between corresponding resistance values is within a threshold (e.g., which may correspond to an industrial standard, a manufacturing tolerance, a calibration of the sensing component, and/or the like). When the sensor controller determines that the pressure sensor is reliable, the sensor controller may determine that the pressure sensor is reliable (e.g., capable of providing reliable measurements), that measurements from the pressure sensor are reliable, is not contaminated (or damaged), and/or the like.

Figure 1B:
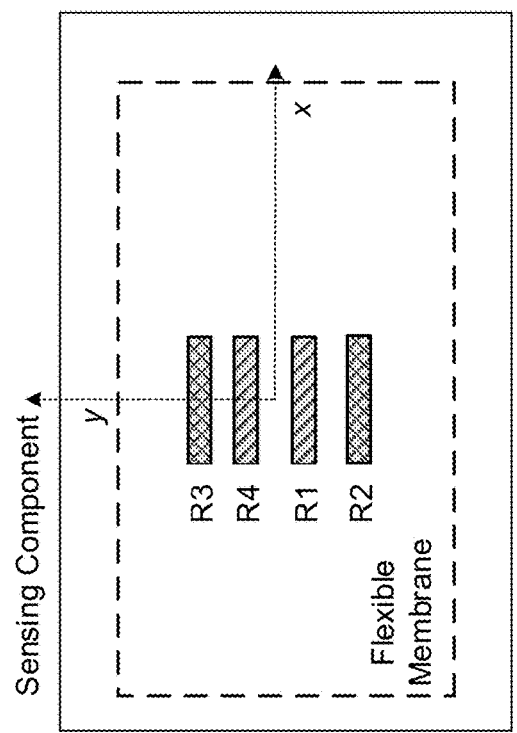

Although the resistors are shown in FIG. 1A with R1 and R4 aligned along the x-axis and R2 and R3 aligned along the y-axis, the resistors may be situated differently in other examples. For example, as shown in FIG. 1B, the resistors may be aligned along the y-axis and the x-axis may serve as an axis of symmetry, with R1 and R4 being equidistant from the x-axis and with R2 and R3 being equidistant from the x-axis. Accordingly, as shown, when uniform pressure is applied to the flexible membrane, the resistances of R1 and R4 are to be relatively equal and the resistances of R2 and R3 are to be relatively equal. Similarly, in some implementations, the resistors may be aligned along the x-axis, and the y-axis may serve as the axis of symmetry. In some implementations, a plurality of Wheatstone bridge circuits may be included within the flexible membrane (e.g., in various configurations) and individually analyzed according to the examples described herein.

In this way, the pressure sensor of example implementation 100 may be configured to provide a reliable pressure measurement when only an environment pressure is applied to the sensing component (or when pressure is uniformly applied to the sensing component) of the pressure sensor.

As further shown in FIG. 1A, and by reference number 120, the sensing component is receiving the environment pressure (which the pressure sensor is configured to measure) and a contamination pressure caused by a contaminant (shown as "C"). The contaminant may be a particle (e.g., a dust particle, a dirt particle, and/or the like), a liquid (e.g., a droplet of water or other type of liquid), a damaged portion of the flexible membrane, and/or the like. Accordingly, the overall pressure (e.g., the combination of the environment pressure and the contaminant pressure) may cause the pressure sensor to generate and/or provide an unreliable and/or erroneous measurement (or sensor read-out). Such a measurement may be erroneous because the pressure sensor is to provide a measurement that corresponds to an atmosphere of the environment (the environment pressure), but the provided measurement would correspond to the combination of the environment pressure and the contaminant pressure.

As described herein, the pressure sensor (and/or an ECU associated with the pressure sensor) may be configured to monitor the status (e.g., a contamination status, an operability status, and/or the like) of the sensing component (e.g., to detect any contaminants associated with the pressure sensor) to determine whether the pressure sensor is capable of providing a reliable measurement (e.g., an accurate measurement) and/or a probability that a measurement is reliable. For example, as shown, the contaminant pressure is focused on a portion of the flexible membrane, and, thus, pressure (an overall pressure) is not uniformly distributed across the flexible membrane. Such non-uniform distribution of pressure across the sensing component may cause the resistors to have abnormal resistances (e.g., R1 R4, R2 R3, the ratio of R1 and R3 being different from the ratio of R2 and R4, and/or the like). Accordingly, the pressure sensor may monitor the sensing component for such contamination pressures based on determined resistances of the resistors.

In this way, the pressure sensor may monitor and/or determine a status of the pressure sensor to determine whether the pressure sensor is unreliable. When the sensor controller determines that the pressure sensor is unreliable, the sensor controller may determine that the pressure sensor is unreliable (e.g., incapable of providing reliable measurements), that measurements from the pressure sensor are unreliable, that the pressure sensor is contaminated, and/or the like.

Figure 1C:
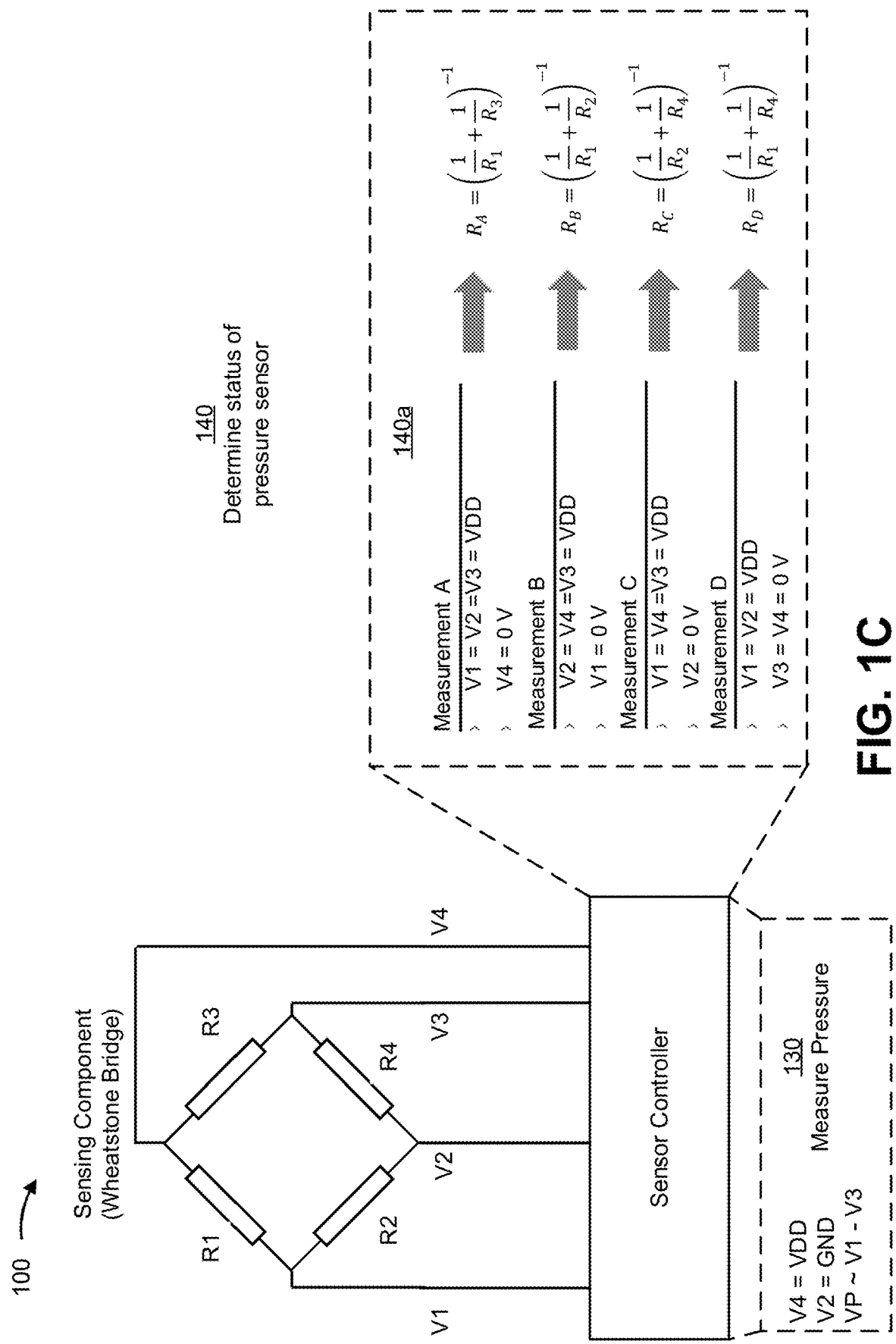

As shown in FIG. 1C, the resistors of the sensing component are configured in a Wheatstone bridge circuit that is communicatively coupled to the sensor controller via terminals V1 to V4. The resistors of the Wheatstone bridge circuit may be physically situated on or within the flexible membrane as shown in FIG. 1A, in FIG. 1B, and/or the like. As shown, R1 and R2 are coupled at terminal V1; R2 and R3 are coupled at terminal V2, R4 and R3 are coupled at terminal V3, and R1 and R3 are coupled at terminal V4. As described herein, R1 and R4 may be considered an opposite pair and R2 and R3 may be considered an opposite pair. For example, R1 and R4 can be considered to be opposite one another in the Wheatstone bridge circuit (e.g., R1 and R4 are not coupled via a same terminal), and R2 and R3 can be considered to be opposite one another in the Wheatstone bridge circuit (e.g., R2 and R3 are not coupled to a same terminal). Furthermore, R1 and R4 can be considered to be opposite one another relative to a dimension of the flexible membrane (toward opposite ends of the x-axis), and R2 and R3 can be considered to be opposite one another relative to another dimension of the flexible membrane (toward opposite ends of the y-axis). For example, as shown in FIG. 1B, pairs of the resistors may be considered opposite one another relative to an axis of symmetry (e.g., the x-axis of FIG. 1B) of the sensing component and/or flexible membrane.

As further shown in FIG. 1C, and by reference number 130, the sensor controller may obtain a pressure measurement (or pressure read-out) from the sensing component. The pressure measurement may be obtained by supplying a voltage (e.g., a drain voltage (VDD) associated with the sensor controller) to terminal V4 and grounding terminal V2, and determining voltage measurements at terminals V1 and V3. In such a case, the pressure measurement VP may correspond to the difference between V1 and V3 (e.g., VP≠V1-V3), which is based on the resistances of R1 to R4. As described herein, the voltage difference VP may be mapped to a corresponding pressure value that indicates the pressure of an atmosphere measured and/or determined by the sensor controller.

In this way, the sensor controller may determine and/or obtain a pressure measurement based on voltage measurements and/or resistances of the resistors of the sensing component.

As further shown in FIG. 1C, and by reference number 140, the sensor controller may determine a status of the pressure sensor (e.g., a status of the sensing component, a status of the flexible membrane, and/or the like). As described herein, the status may be representative of whether the sensing component is reliable based on whether the sensing component is contaminated. Additionally, or alternatively, the status may indicate whether a measurement from the sensor controller is reliable. For example, based on receiving a measurement, the sensor controller may determine the status of the pressure sensor, and if the status indicates that the pressure sensor is reliable (or reliable), the sensor controller may determine that the measurement is reliable. On the other hand, if the status indicates that the pressure sensor is unreliable (or unreliable) (e.g., due to the presence of a contaminant associated with the sensing component), the sensor controller may determine that the measurement is unreliable.

As described herein, to determine the status of the pressure sensor, the sensor controller may determine resistances of the resistors and compare at least two of the resistors. For example, the sensor controller may compare resistances of an opposite pair of resistors (e.g., resistances of R1 and R4 and/or resistances of R2 and R3). In such a case, if a difference between the resistances is greater than a threshold (and/or if one of the resistances is outside of a threshold percentage of the other), the sensor controller may determine that the pressure sensor is unreliable (e.g., due to the sensing component being contaminated), and if the difference between the resistances is less than a threshold (and/or if one of the resistances is inside of a threshold percentage of the other), the sensor controller may determine that the pressure sensor is reliable. Additionally, or alternatively, the sensor controller may similarly compare one or more ratios of pairs of the resistors (e.g., a ratio of resistances of R1 and R2 with a ratio of resistances of R3 and R4, a ratio of resistances of R1 and R3 with a ratio of resistances of R2 and R4, and/or the like) and determine the status based on any differences between the one or more ratios.

Due to the resistors being configured in the Wheatstone bridge circuit, the sensor controller may perform a plurality of calculations to determine individual resistance values of each of the resistors. For example, when measuring the resistance of a first resistor (R1) of the Wheatstone bridge circuit via the terminals of the first resistor, the first resistor is in parallel with the three remaining resistors (R2, R3, R4) of the Wheatstone bridge circuit, which are in series. Accordingly, the resistance value of the first resistor (R1) is affected by the resistances of the three remaining resistors being in series. Therefore, the sensor controller may not be able to simply measure a resistance across a resistor via the terminals of the resistor. More specifically, to determine the resistance of R1, the sensor controller may not be able to measure the resistance across terminals V1 and V4 because R2, R3, and R4 are also across terminals V1 and V4. Therefore, the sensor controller may determine the resistances of the resistors based on determining corresponding conductances (or conductance values) of the resistors.

As further shown in FIG. 1C, and by reference number 140a, the sensor controller may apply bias voltages to and/or ground the terminals of the Wheatstone bridge circuit to determine a plurality of resistance measurements of the Wheatstone bridge circuit. As an example, a resistance measurement Rx, which determined by supplying voltage to and grounding one or more of terminals V1 to V4, may be determined by:

$$R_X = \left(\frac{1}{R_i} + \frac{1}{R_j}\right)^{-1} \tag{1}$$

where Rx is resistance of resistors $R_i$ and $R_j$ in parallel, and where $R_i$ and $R_j$ are two of resistors R1 to R4. To determine the conductance of the resistors, the sensor controller may determine resistance measurements $R_A$ to $R_D$ according to voltage biases and grounding indicated in measurements A to D, as shown. Further, a conductance G of a resistor corresponds to the inverse of the resistance R of the resistor (G=1/R).

Figure 1D:
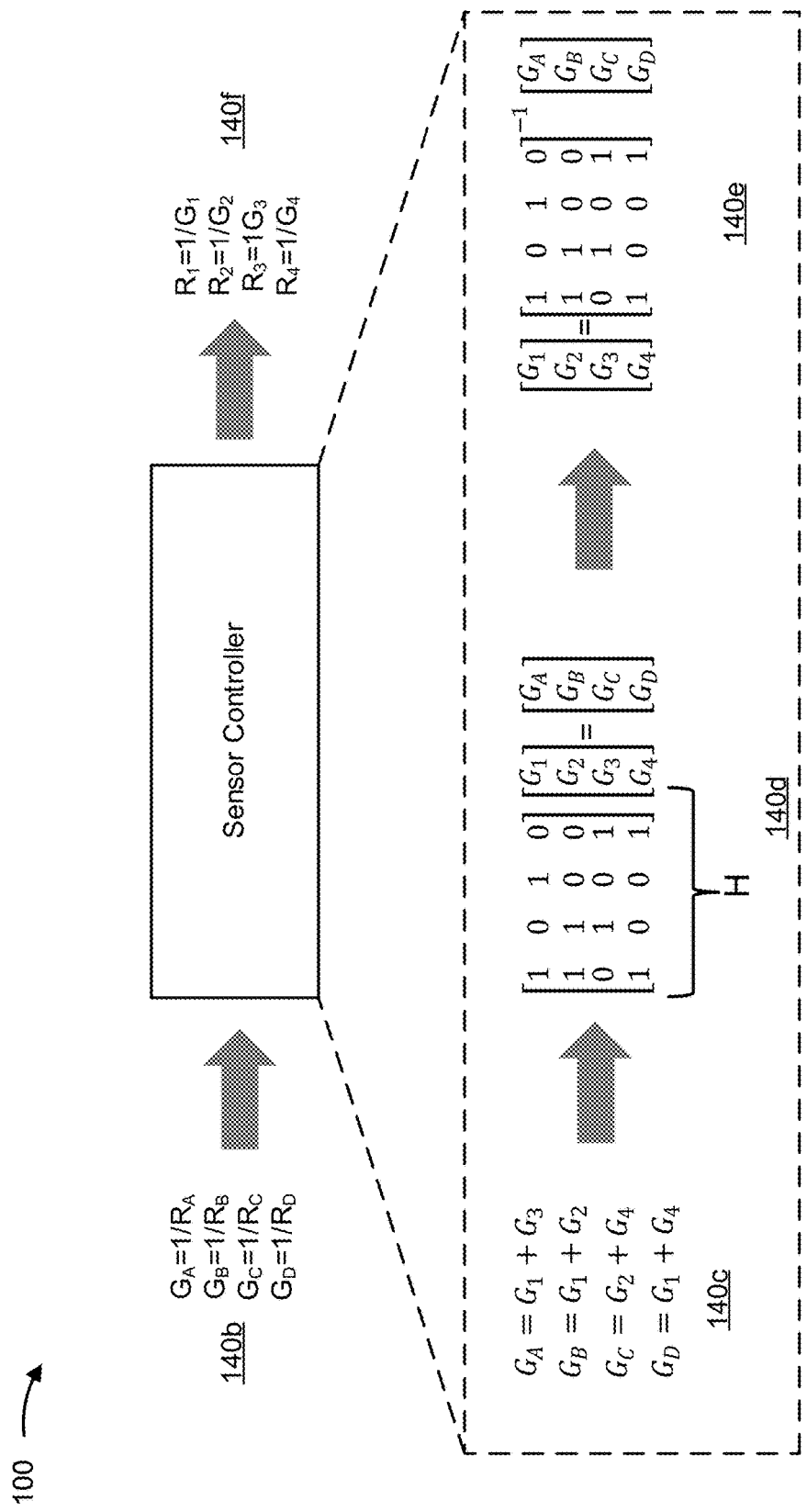

As shown in FIG. 1D, and by reference number 140b, the conductance measurements $G_A$ to $G_D$ correspond to the inverse of the resistance measurements $R_A$ to $R_D$, respectively. Further, as shown by reference number 140c, the conductance measurements may correspond to respective sums of respective conductances of the corresponding resistors of the conductance measurements. As shown by reference number 140d, a linear system (represented by the matrix 'H') associated with the conductance measurements $G_A$ to $G_D$ can be formed to determine the respective conductances G1 to G4 of resistors R1 to R4. For example, the first row ('1 0 1 0') of the matrix is representative of the conductance values used to calculate $G_A$ (G1 and G3), the second row ('1 1 0 0') of the matrix is representative of the conductance values used to calculate $G_B$ (G1 and G2), the third row ('0 1 0 1') of the matrix is representative of the conductance values used to calculate $G_C$ (G2 and G4), and the fourth row ('1 0 0 1') of the matrix is representative of the conductance values used to calculate $G_D$ (G1 and G4). Further, the matrix 'H' can be inverted (e.g., because det (H)=2).

As further shown in FIG. 1D, and by reference number 140e, the conductance values G1 to G4 can be determined from the inverted matrix 'H' in combination with the conductance measurements $G_A$ to $G_D$. As shown by reference number 140f, from the conductance values G1 to G4, the resistances R1 to R4 can be determined.

Figure 1E:
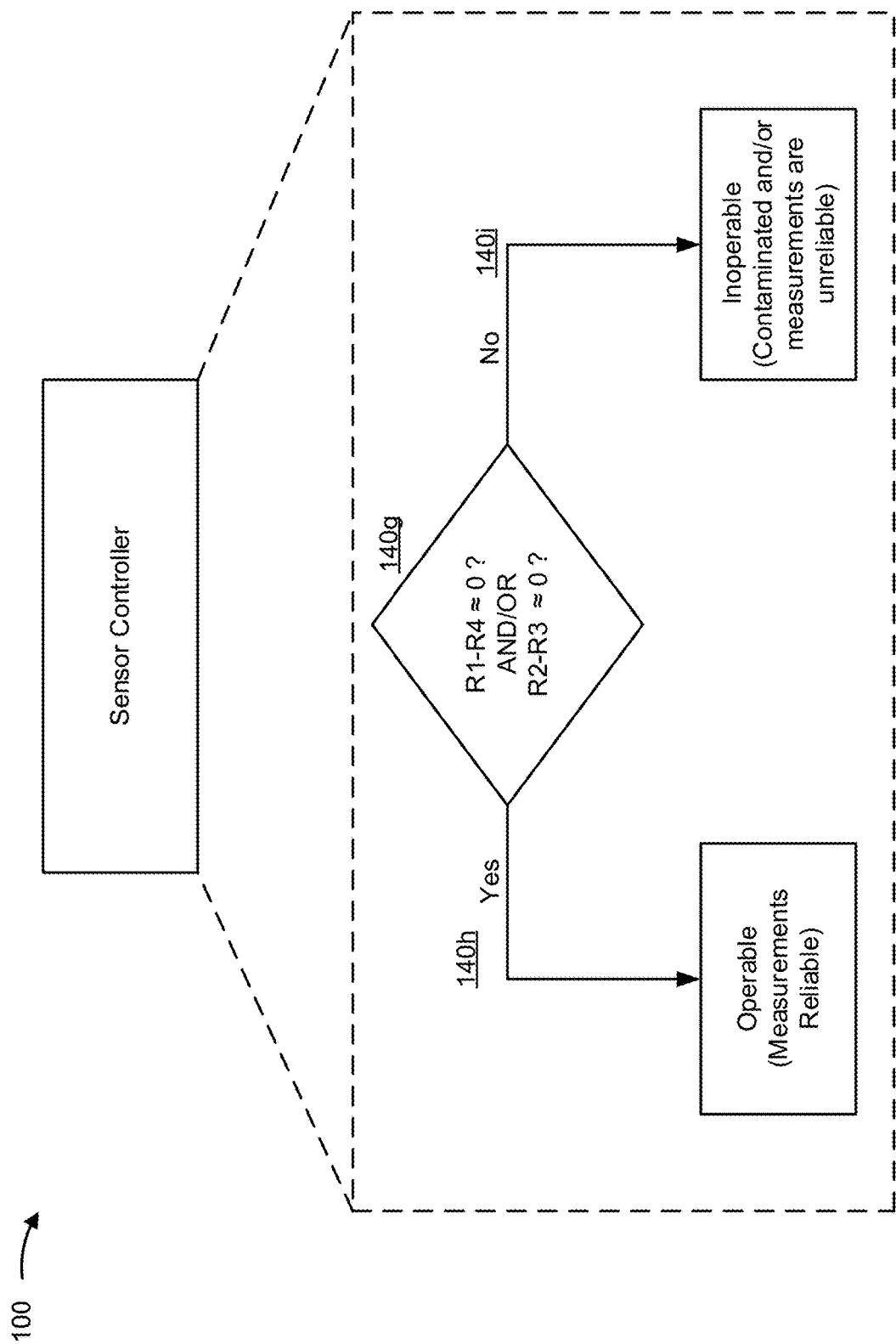

As shown in FIG. 1E, and by reference number 140g, the sensor controller may compare the resistances of R1 and R4 and/or the resistances of R2 and R3. As shown by reference number 140h, if the difference between R1 and R4 is zero and/or if the difference between R2 and R3 is zero (or within a threshold of zero), the sensor controller may determine that the pressure sensor (or sensing component) is reliable. Furthermore, the sensor controller may determine that a measurement from the pressure sensor (e.g., a recently obtained or received measurement) is reliable and/or has a high probability of being reliable, as described herein. In such cases, the sensor controller may provide and/or enable a pressure measurement of the pressure sensor to be output (e.g., to a user interface, to a control device, and/or the like) to permit one or more actions to be performed according to the pressure measurement (e.g., display the pressure measurement, use the pressure measurement to control an operation of a system associated with the pressure sensor, and/or the like).

As further shown in FIG. 1E, and by reference number 140i, if the difference between R1 and R4 is not zero and/or if the difference between R2 and R3 is not zero (or outside of a threshold of zero (e.g., less than or greater than a threshold from zero)), the sensor controller may determine that the pressure sensor (or sensing component) is unreliable. Furthermore, the sensor controller may determine that the pressure sensor (or sensing component) is contaminated and/or that a measurement from the pressure sensor (e.g., a recently obtained or received measurement) is unreliable and/or has a low probability of being reliable, as described herein. In such cases, the sensor controller may send a notification to a user interface to indicate that the pressure sensor is unreliable, that a contaminant may be in contact with the flexible membrane, that a measurement may be inaccurate and/or unreliable, and/or the like. Additionally, or alternatively, the sensor controller may disable the sensing component (e.g., by shutting down the sensing component, by disconnecting power to the sensing component, and/or the like). In some implementations, the sensor controller may continue to monitor and/or determine the resistances of the resistors, as described herein, to determine when or if the sensing component is no longer contaminated and/or if the pressure sensor becomes reliable again.

According to some implementations, the sensor controller may determine a probability of reliability of a measurement from the pressure sensor based on the difference between the resistances of R1 and R4 and/or based on the differences between the resistances of R2 and R3. For example, the sensor controller may use a mapping that maps probabilities of reliability to corresponding differences between R1 and R4, to corresponding differences between R2 and R3, and/or to combinations of differences between R1 and R4 and differences between R2 and R3.

In this way, the sensor controller may monitor and determine whether a sensing component of a pressure sensor is contaminated and/or capable of providing reliable measurements.

As indicated above, FIGS. 1A-1E are provided merely as one or more examples. Other examples may differ from what is described with regard to FIGS. 1A-1E.

Figure 2:
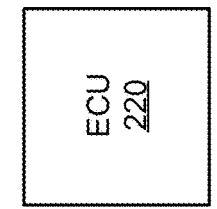
FIG. 2 is a diagram of an example environment in which systems and/or methods described herein may be implemented.
Figure 2:
Figure 2:
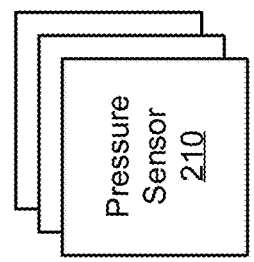

FIG. 2 is a diagram of an example system 200 in which systems and/or methods described herein may be implemented. As shown in FIG. 2, system 200 may include one or more pressure sensors 210 (referred to individually as a "pressure sensor 210" and collectively as "pressure sensors 210") and an electronic control unit (ECU) 220. Components of system 200 may interconnect via wired connections, wireless connections, or a combination of wired and wireless connections. In some implementations, system 200 may correspond to a tire pressure monitoring system (TPMS).

Pressure sensor 210 may include one or more devices, elements, and/or circuits configured to receive, generate, determine, and/or provide a pressure measurement representative of a pressure of an environment. For example, pressure sensor 210 may include a flexible membrane and/or a plurality of variable resistors in a Wheatstone bridge circuit (e.g., as described above in connection with example implementation 100).

During operation, pressure sensor 210, based on measurements (e.g., voltage measurements, resistance measurements, conductance measurements, and/or the like) associated with the variable resistors, may monitor a reliability of the pressure sensor and/or measure a pressure of an atmosphere (e.g., a target atmosphere, such as an air chamber of a tire, a room of a building, an outdoor environment, and/or the like) associated with system 200, as described herein. Pressure sensor 210 may then compare the measurements to mapping information that maps the measurements (e.g., VP) to corresponding pressure values, corresponding reliability measurements (or probabilities of being reliable), and/or the like. For example, pressure sensor 210 may identify pressure measurements and/or reliability measurements included in the mapping information, that match (e.g., within a threshold) the measured pressure and/or reliability measurements. In this example, pressure sensor 210 may determine the pressure of the atmosphere and/or the reliability of the pressure sensor to be the pressure and/or reliability in the matched mapping information. Accordingly, pressure sensor 210 may determine the pressure of the atmosphere and/or a reliability of the pressure sensor based on the comparison.

ECU 220 includes one or more circuits associated with receiving, processing, and/or providing pressure information and/or status information associated with pressure sensors 210. For example, ECU 220 may include one or more of an integrated circuit, a control circuit, a feedback circuit, and/or the like. ECU 220 may be a processor (e.g., a microprocessor, a digital signal processor, an analog signal processor, and/or the like). ECU 220 may receive input signals from one or more pressure sensors 210 (e.g., from a digital signal processor (DSP) of pressure sensors 210), may process the input signals (e.g., using an analog signal processor, a digital signal processor, and/or the like) to generate an output signal, and may provide the output signal to one or more other devices or systems (e.g., a user interface, a control device, a control system, a monitoring system, and/or the like). For example, ECU 220 may receive one or more input signals from pressure sensors 210 and may use the one or more input signals to generate an output signal comprising the pressure measured by the pressure signal, the status (or reliability) of pressure sensors 210, and/or the like.

In some implementations, ECU 220 may be configured with mapping information associated with determining the pressure of an atmosphere of system 200 and/or status of pressure sensors 210. ECU 220 may store the mapping information in a memory element (e.g., a read only memory (ROM) (e.g., an electrically erasable programmable read-only memory (EEPROM)), a random-access memory (RAM), and/or another type of dynamic or static storage device (e.g., a flash memory, a magnetic memory, an optical memory, etc.)) of ECU 220. The mapping information may include measurement information associated with pressures of various environments and/or types of environments. The mapping information may include such measurement information for multiple pressures in the corresponding environments or types of environments. In some implementations, ECU 220 may be configured with the mapping information during a manufacturing process, a calibration process associated with pressure sensor 210, a setup process associated with pressure sensor 210, and/or the like.

As described herein, ECU 220 may perform one or more actions according to the pressure measurements, reliability measurements, and/or determined status of the pressure sensors 210. For example, ECU 220 may send a notification to a user interface (e.g., a display, an indicator, and/or the like), a control device that utilizes pressure measurements from pressure sensor 210, and/or the like. Such a notification may indicate a status of pressure sensor 210 (e.g., that pressure sensor 210 is unreliable, that pressure sensor 210 may be providing inaccurate or unreliable measurements, and/or the like), may indicate that a particular measurement is unreliable, and/or the like. In some implementations, ECU 220 may prevent pressure sensor 210 from providing a measurement (e.g., until pressure sensor 210 is reliable and/or no longer contaminated). For example, ECU 220 may disable and/or shutdown pressure sensor 210 (e.g., to conserve power of a system, to conserve computing resources associated with receiving erroneous measurements, to prevent damage to a system that relies on the erroneous measurements, and/or the like).

In some implementations, ECU 220 may control a frequency associated with determining the status of pressure sensor 210 (e.g., based on determining differences between a pair of resistors of pressure sensor 210). For example, if ECU 220 determines, from the status, that pressure sensor 210 is contaminated, ECU 220 may increase a frequency of iteratively determining the status of pressure sensor 210 to determine when or if a detected contaminant is no longer affecting a reliability of the pressure sensor 210. Additionally, or alternatively, if the status indicates that pressure sensor 210 is reliable and/or providing reliable measurements (e.g., is functioning normally or as configured), ECU 220 may decrease the frequency of iteratively determining the status of pressure sensor 210.

The number and arrangement of components shown in FIG. 2 are provided as examples. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components.

Additionally, or alternatively, a set of components (e.g., one or more components) of system 200 may perform one or more functions described as being performed by another set of components of system 200.

Figure 3:
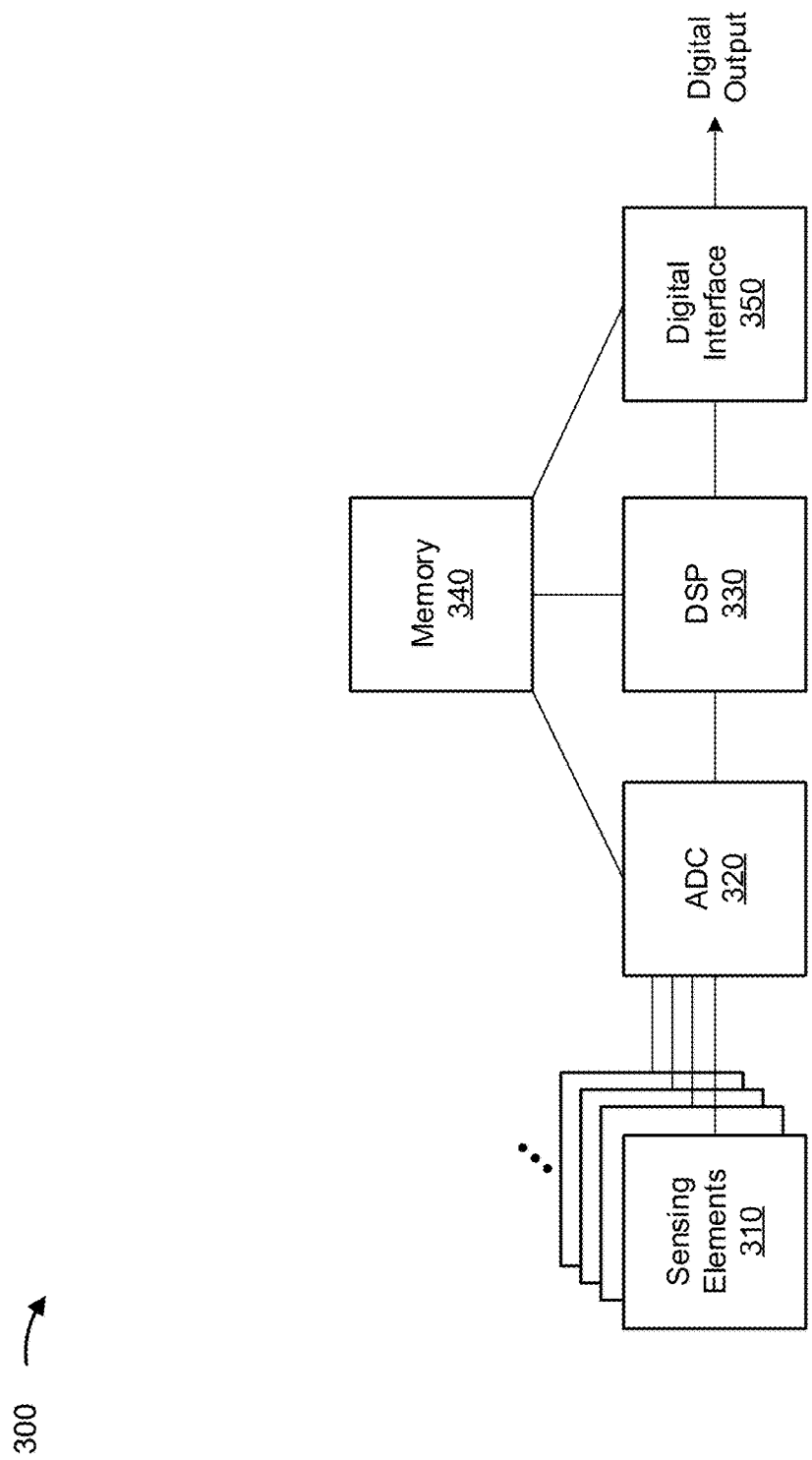
FIG. 3 is a diagram of example components of one or more devices of FIG. 2.

FIG. 3 is a diagram of example elements of a sensor 300. Sensor 300 may correspond to pressure sensor 210 of FIG. 2. As shown, sensor 300 may include a set of sensing elements 310 (which may be referred to herein individually as "sensing element 310" or collectively as "sensing elements 310"), an analog-to-digital convertor (ADC) 320, a digital signal processor (DSP) 330, a memory 340, and a digital interface 350.

Sensing elements 310 include one or more elements for sensing a pressure of an environment associated with sensor 300. Sensing elements 310 may be placed and/or configured on and/or within a flexible membrane of sensor 300. Further, sensing element 310 may include a variable resistor that is configured to have a resistance that is based on an amount of flex of the variable resistor, a position of the variable resistor, and/or the like. Accordingly, as the flexible membrane is flexed or moved (e.g., due to a change in pressure of an environment of the flexible membrane) the resistance of sensing elements 310 may change. Sensing elements 310 may be configured in a Wheatstone bridge circuit (e.g., similar to resistors R1-R4 in example implementation 100). In such a configuration, differences in resistances between sensing elements 310 may be used to determine a pressure measurement and/or a reliability of sensing elements to provide an accurate pressure measurement.

ADC 320 may include an analog-to-digital converter that converts an analog signal (e.g., a voltage signal) from the set of sensing elements 310 to a digital signal. For example, ADC 320 may convert analog signals, received from the set of sensing elements 310, into digital signals to be processed by DSP 330. ADC 320 may provide the digital signals to DSP 330. In some implementations, sensor 300 may include one or more ADCs 320. Additionally, or alternatively, ADC 320 may be used (e.g., according to instructions from DSP 330) to supply a bias voltage to one or more terminals of sensing elements 310, to ground one or more terminals of sensing elements 310, and/or the like to permit sensor 300 to monitor a reliability of sensing elements 310.

DSP 330 may include a digital signal processing device or a collection of digital signal processing devices. In some implementations, DSP 330 may receive digital signals from ADC 320 and may process the digital signals to form output signals (e.g., destined for controller 225 as shown in FIG. 2A), such as output signals associated with determining the pressure of an environment of pressure sensor 210.

Memory 340 may include a read only memory (ROM) (e.g., an electrically erasable programmable read-only memory (EEPROM)), a random access memory (RAM), and/or another type of dynamic or static storage device (e.g., a flash memory, a magnetic memory, an optical memory, etc.) that stores information and/or instructions for use by sensor 300. In some implementations, memory 340 may store information associated with processing performed by DSP 330. Additionally, or alternatively, memory 340 may store configurational values or parameters for the set of sensing elements 310 and/or information for one or more other elements of sensor 300, such as ADC 320 or digital interface 350.

Digital interface 350 may include an interface via which sensor 300 may receive and/or provide information from and/or to another device, such as ECU 220 of FIG. 2. For example, digital interface 350 may provide the output signal, determined by DSP 330, to ECU 220 and may further receive information (e.g., control instructions) from the ECU 220. One or more of ADC 320, DSP 330, memory 340, or digital interface 350 may be associated with (e.g., included within and/or communicatively coupled to) a sensor controller of sensor 300.

The number and arrangement of elements shown in FIG. 3 are provided as an example. In practice, sensor 300 may include additional elements, fewer elements, different elements, or differently arranged elements than those shown in FIG. 3. Additionally, or alternatively, a set of elements (e.g., one or more elements) of sensor 300 may perform one or more functions described as being performed by another set of elements of sensor 300.

Figure 4:
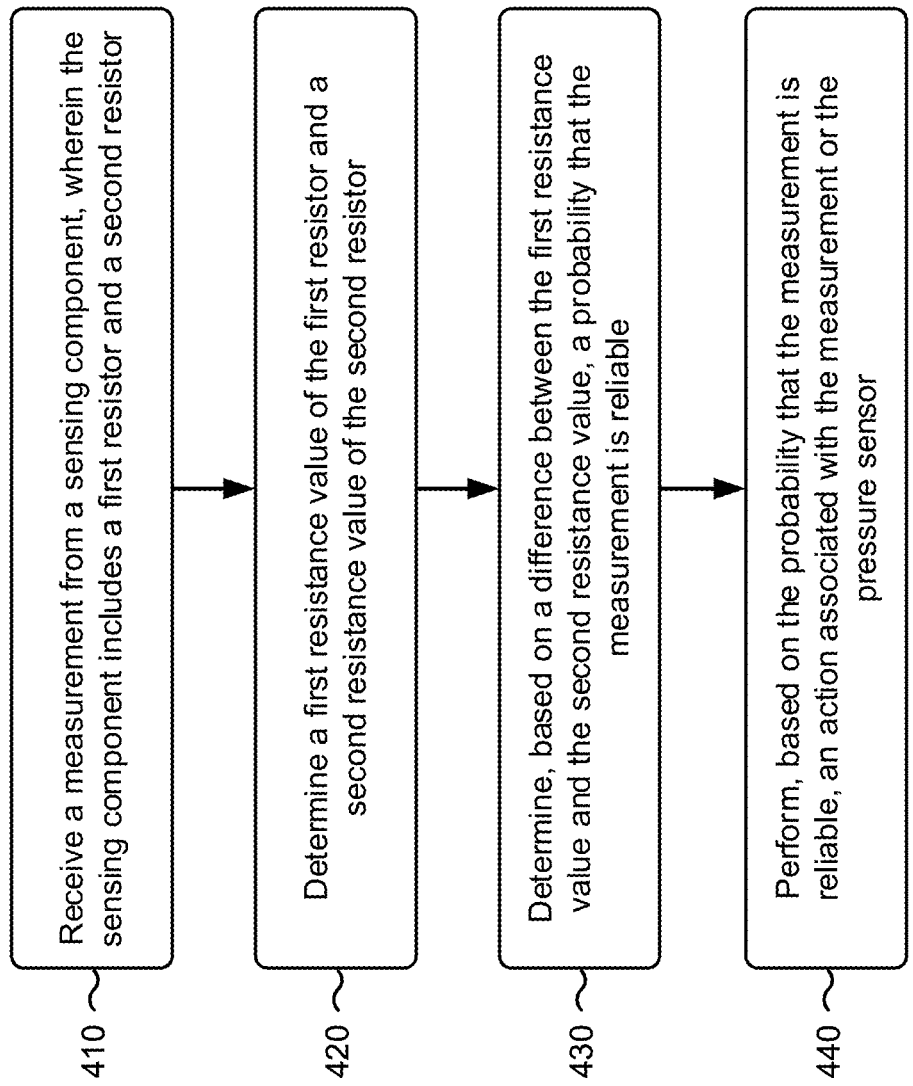

FIG. 4 is a flowchart of an example process 400 for determining reliability of a pressure sensor. In some implementations, one or more process blocks of FIG. 4 may be performed by a pressure sensor (e.g., pressure sensor 210). In some implementations, one or more process blocks of FIG. 4 may be performed by another device or a group of devices separate from or including the pressure sensor, such as an ECU (e.g., ECU 220) and/or the like.

As shown in FIG. 4, process 400 may include receiving a measurement from a sensing component, wherein the sensing component includes a first resistor and a second resistor (block 410). For example, the pressure sensor (e.g., using sensing element 310, ADC 320, DSP 330, memory 340, digital interface 350, and/or the like) may receive a measurement from a sensing component, as described above. In some implementations, the sensing component includes a first resistor and a second resistor.

As further shown in FIG. 4, process 400 may include determining a first resistance value of the first resistor and a second resistance value of the second resistor (block 420). For example, the pressure sensor (e.g., using sensing element 310, ADC 320, DSP 330, memory 340, digital interface 350, and/or the like) may determine a first resistance value of the first resistor and a second resistance value of the second resistor, as described above.

As further shown in FIG. 4, process 400 may include determining, based on a difference between the first resistance value and the second resistance value, a probability that the measurement is reliable (block 430). For example, the pressure sensor (e.g., using sensing element 310, ADC 320, DSP 330, memory 340, digital interface 350, and/or the like) may determine, based on a difference between the first resistance value and the second resistance value, a probability that the measurement is reliable, as described above.

As further shown in FIG. 4, process 400 may include performing, based on the probability that the measurement is reliable, an action associated with the measurement or the pressure sensor (block 440). For example, the pressure sensor (e.g., using sensing element 310, ADC 320, DSP 330, memory 340, digital interface 350, and/or the like) may perform, based on the probability that the measurement is reliable, an action associated with the measurement or the pressure sensor, as described above.

Process 400 may include additional implementations, such as any single implementation or any combination of implementations described below and/or in connection with one or more other processes described elsewhere herein.

In a first implementation, the first resistor and the second resistor are in a Wheatstone bridge circuit of the sensing component. In a second implementation, alone or in combination with the first implementation, the first resistor and the second resistor are connected to a same terminal of the Wheatstone bridge circuit.

In a third implementation, alone or in combination with one or more of the first and second implementations, the first resistor and the second resistor are situated in a circuit on or within a flexible membrane of the sensing component, and the flexible membrane, when flexed, is configured to affect the first resistance value and the second resistance value.

In a fourth implementation, alone or in combination with one or more of the first through third implementations, the probability that the measurement is reliable is determined to be relatively high when the difference between the first resistance value and the second resistance value is within a first threshold, and the probability that the measurement is reliable is determined to be relatively low when the difference between the first resistance value and the second resistance value is greater than a second threshold.

In a fifth implementation, alone or in combination with one or more of the first through fourth implementations, the first resistance value and the second resistance value are determined based on receiving the measurement. In a sixth implementation, alone or in combination with one or more of the first through fifth implementations, the first resistance value and the second resistance value are respectively determined based on a first conductance value of the first resistor and a second conductance value of the second resistor, and the first conductance value and the second conductance value are respectively determined by applying bias voltages across the first resistor and the second resistor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for determining reliability of a pressure sensor. In some implementations, one or more process blocks of FIG. 5 may be performed by pressure sensor (e.g., pressure sensor 210). In some implementations, one or more process blocks of FIG. 5 may be performed by another device or a group of devices separate from or including the pressure sensor, such as an ECU (e.g., ECU 220) and/or the like.

As shown in FIG. 5, process 500 may include monitoring, by iteratively biasing terminals of a Wheatstone bridge circuit with a voltage supply and a ground, a first resistance value of a first resistor of the Wheatstone bridge circuit and a second resistance value of a second resistor of the Wheatstone bridge circuit determine, based on a difference between the first resistance value and the second resistance value (block 510). For example, the pressure sensor (e.g., using sensing element 310, ADC 320, DSP 330, memory 340, digital interface 350, and/or the like) may monitor, by iteratively biasing terminals of a Wheatstone bridge circuit with a voltage supply and a ground, a first resistance value of a first resistor of the Wheatstone bridge circuit and a second resistance value of a second resistor of the Wheatstone bridge circuit determine, based on a difference between the first resistance value and the second resistance value, as described above.

As further shown in FIG. 5, process 500 may include determining a status of the flexible membrane, wherein the status indicates whether a measurement from a sensing component is reliable (block 520). For example, the pressure sensor (e.g., using sensing element 310, ADC 320, DSP 330, memory 340, digital interface 350, and/or the like) may determine, based on a difference between the first resistance value and the second resistance value, a status of the flexible membrane, as described above. In some implementations, the status indicates whether a measurement from the sensing component is reliable.

As further shown in FIG. 5, process 500 may include performing, based on the status, an action associated with the sensing component (block 530). For example, the pressure sensor (e.g., using sensing element 310, ADC 320, DSP 330, memory 340, digital interface 350, and/or the like) may perform, based on the status, an action associated with the sensing component, as described above.

Process 500 may include additional implementations, such as any single implementation or any combination of implementations described below and/or in connection with one or more other processes described elsewhere herein.

In a first implementation, the first resistor and the second resistor are not connected to a same terminal of the Wheatstone bridge circuit. In a second implementation, alone or in combination with the first implementation, the status indicates that the measurement is unreliable when the difference between the first resistance value and the second resistance value satisfies a threshold, and the status indicates that the measurement is reliable when the difference between the first resistance value and the second resistance value does not satisfy the threshold.

In a third implementation, alone or in combination with one or more of the first and second implementations, when the status indicates that the measurement is unreliable due to a contaminant being in contact with the flexible membrane, the pressure sensor, when performing the action, is to increase a frequency of iterations associated with iteratively biasing the terminals of the Wheatstone bridge circuit to monitor the flexible membrane to permit the sensor controller to determine when the contaminant is no longer in contact with the flexible membrane.

In a fourth implementation, alone or in combination with one or more of the first through third implementations, when the status indicates that the measurement is unreliable, the pressure sensor, when performing the action, is to at least one of: send a notification to a user interface to indicate that a contaminant may be in contact with the flexible membrane; indicate that a measurement from the sensing component is likely inaccurate; or disable the sensing component.

In a fifth implementation, alone or in combination with one or more of the first through fourth implementations, when the status indicates that the measurement is unreliable, the pressure sensor, when performing the action, is to: measure a first voltage of a first measurement terminal of the Wheatstone bridge circuit, measure a second voltage of a second measurement terminal of the Wheatstone bridge circuit, determine, based on a difference between the first voltage and the second voltage, a pressure measurement associated with an environment of the flexible membrane, and perform an action associated with the pressure measurement.

In a sixth implementation, alone or in combination with one or more of the first through fifth implementations, the flexible membrane, when flexed, is configured to cause the Wheatstone bridge circuit to output different voltage values based on changes to at least one of the first resistance value or the second resistance value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for determining reliability of a pressure sensor. In some implementations, one or more process blocks of FIG. 6 may be performed by pressure sensor (e.g., pressure sensor 210). In some implementations, one or more process blocks of FIG. 6 may be performed by another device or a group of devices separate from or including the pressure sensor, such as an ECU (e.g., ECU 220) and/or the like.

As shown in FIG. 6, process 600 may include monitoring a first resistance value of a first resistor and a second resistance value of a second resistor, wherein the first resistor and the second resistor are sensing components of a sensing component of a pressure sensor (block 610). For example, the pressure sensor (e.g., using sensing element 310, ADC 320, DSP 330, memory 340, digital interface 350, and/or the like) may monitor a first resistance value of a first resistor and a second resistance value of a second resistor, as described above. In some implementations, the first resistor and the second resistor are sensing components of a sensing component of a pressure sensor.

As further shown in FIG. 6, process 600 may include determining, based on a difference between the first resistance value and the second resistance value satisfying a threshold, that a measurement from the sensing component is unreliable (block 620). For example, the pressure sensor (e.g., using sensing element 310, ADC 320, DSP 330, memory 340, digital interface 350, and/or the like) may determine, based on a difference between the first resistance value and the second resistance value satisfying a threshold, that a measurement from the sensing component is unreliable, as described above.

As further shown in FIG. 6, process 600 may include performing, based on determining that the measurement from the sensing component is unreliable, an action associated with the pressure sensor (block 630). For example, the pressure sensor (e.g., using sensing element 310, ADC 320, DSP 330, memory 340, digital interface 350, and/or the like) may perform, based on determining that the measurement from the sensing component is unreliable, an action associated with the pressure sensor, as described above.

Process 600 may include additional implementations, such as any single implementation or any combination of implementations described below and/or in connection with one or more other processes described elsewhere herein.

In a first implementation, the sensing component include a flexible membrane and a Wheatstone bridge circuit, and the first resistor and the second resistor are opposite resistors in the Wheatstone bridge. In a second implementation, alone or in combination with the first implementation, the pressure sensor, when monitoring the first resistance value and the second resistance value, is to: determine a first conductance value of the first resistor and a second conductance value of the second resistor and determine the first resistance value based on the first conductance value and the second resistance value based on the second conductance value.

In a third implementation, alone or in combination with one or more of the first and second implementations, the first resistor and the second resistor are in a Wheatstone bridge circuit, and the first conductance and the second conductance are determined by applying a supply voltage to one or more terminals of the Wheatstone bridge circuit and a ground to one or more terminals of the Wheatstone bridge circuit.

In a fourth implementation, alone or in combination with one or more of the first through third implementations, the pressure sensor, when performing the action, is to at least one of: increase a frequency associated with determining the difference between the first resistance value and the second resistance value, send a notification to a user interface to indicate that the measurement is unreliable, prevent the pressure sensor from providing a measurement, or disable the pressure sensor. In a fifth implementation, alone or in combination with one or more of the first through fourth implementations, the pressure sensor comprises a sensor of a tire pressure monitoring system.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A pressure sensor, comprising:
   one or more memories; and
   one or more processors coupled to the one or more memories, configured to:
      receive a measurement from a sensing component,
         wherein the sensing component includes a first resistor and a second resistor;
      determine a first resistance value of the first resistor and a second resistance value of the second resistor;
      determine, based on a difference between the first resistance value and the second resistance value satisfying a threshold, that the measurement is unreliable; and
      perform, based on determining that the measurement is unreliable, an action associated with the measurement or the pressure sensor,
         wherein the one or more processors, when performing the action, are to:
            increase a frequency associated with determining the difference between the first resistance value and the second resistance value.

2. The pressure sensor of claim 1, wherein the first resistor and the second resistor are in a Wheatstone bridge circuit of the sensing component.

3. The pressure sensor of claim 2, wherein the first resistor and the second resistor are not coupled to a same terminal of the Wheatstone bridge circuit.

4. The pressure sensor of claim 1, wherein the first resistor and the second resistor are situated in a circuit on or within a flexible membrane of the sensing component,
   wherein the flexible membrane, when flexed, is configured to affect the first resistance value and the second resistance value.

5. The pressure sensor of claim 1, wherein a probability that the measurement is reliable is determined to be relatively high when the difference between the first resistance value and the second resistance value is within another threshold, and
   wherein the probability that the measurement is reliable is determined to be relatively low when the difference between the first resistance value and the second resistance value is greater than the threshold.

6. The pressure sensor of claim 1, wherein the first resistance value and the second resistance value are determined based on receiving the measurement.

7. The pressure sensor of claim 1, wherein the first resistance value and the second resistance value are respectively determined based on a first conductance value of the first resistor and a second conductance value of the second resistor,
wherein the first conductance value and the second conductance value are respectively determined by applying bias voltages across the first resistor and the second resistor.

8. A system comprising:
a sensing component comprising:
a flexible membrane, and
a Wheatstone bridge circuit; and
a sensor controller configured to:
monitor, based on iteratively biasing terminals of the Wheatstone bridge circuit with a voltage supply and a ground, a first resistance value of a first resistor of the Wheatstone bridge circuit and a second resistance value of a second resistor of the Wheatstone bridge circuit;
determine, based on a difference between the first resistance value and the second resistance value, a status of the flexible membrane,
wherein the status indicates that a measurement from the sensing component is unreliable based on the difference between the first resistance value and the second resistance value satisfying a threshold; and
perform, based on determining that the status is unreliable, an action associated with the sensing component,
wherein, when performing the action, the sensor controller is configured to:
increase a frequency associated with determining the difference between the first resistance value and the second resistance value.

9. The system of claim 8, wherein the first resistor and the second resistor are opposite one another in the Wheatstone bridge circuit.

10. The system of claim 8,
wherein the status indicates that the measurement is reliable when the difference between the first resistance value and the second resistance value does not satisfy the threshold.

11. The system of claim 8, wherein, when the status indicates that the measurement is unreliable due to a contaminant being in contact with the flexible membrane, the sensor controller, when increasing the frequency associated with determining the difference between the first resistance value and the second resistance value, is configured to:
increase a frequency of iterations associated with iteratively biasing the terminals of the Wheatstone bridge circuit to monitor the flexible membrane to permit the sensor controller to determine when the contaminant is no longer in contact with the flexible membrane.

12. The system of claim 8, wherein, when the status indicates that the measurement is unreliable, the sensor controller, when performing the action, is further configured to at least one of:
send a notification to a user interface to indicate that a contaminant may be in contact with the flexible membrane;
indicate that the measurement is likely inaccurate; or
disable the sensing component.

13. The system of claim 8, wherein, when the status indicates that the measurement is unreliable, the sensor controller, when performing the action, is further configured to:
measure a first voltage of a first measurement terminal of the Wheatstone bridge circuit;
measure a second voltage of a second measurement terminal of the Wheatstone bridge circuit;
determine, based on a difference between the first voltage and the second voltage, a pressure measurement associated with an environment of the flexible membrane; and
perform an action associated with the pressure measurement.

14. The system of claim 8, wherein the flexible membrane, when flexed, is configured to cause the Wheatstone bridge circuit to output different voltage values based on changes to at least one of the first resistance value or the second resistance value.

15. A method, comprising:
monitoring, by a device, a first resistance value of a first resistor and a second resistance value of a second resistor,
wherein the first resistor and the second resistor are sensing elements of a sensing component of a pressure sensor;
determining, by the device and based on a difference between the first resistance value and the second resistance value satisfying a threshold, that a measurement from the sensing component is unreliable; and
performing, by the device and based on determining that the measurement from the sensing component is unreliable, an action associated with the pressure sensor,
wherein performing the action comprises:
increasing a frequency associated with determining the difference between the first resistance value and the second resistance value.

16. The method of claim 15, wherein the sensing component comprises:
a flexible membrane; and
a Wheatstone bridge circuit,
wherein the first resistor and the second resistor are opposite resistors in the Wheatstone bridge.

17. The method of claim 15, wherein monitoring the first resistance value and the second resistance value comprises:
determining a first conductance value of the first resistor and a second conductance value of the second resistor; and
determining the first resistance value based on the first conductance value and the second resistance value based on the second conductance value.

18. The method of claim 17, wherein the first resistor and the second resistor are in a Wheatstone bridge circuit, and
wherein the first conductance value and the second conductance value are determined by applying a supply voltage to one or more terminals of the Wheatstone bridge circuit and a ground to one or more other terminals of the Wheatstone bridge circuit.

19. The method of claim 15, wherein performing the action further comprises at least one of:
sending a notification to a user interface to indicate that the measurement is unreliable;
preventing the pressure sensor from providing another measurement; or
disabling the pressure sensor.

20. The method of claim 15, wherein the pressure sensor comprises a sensor of a tire pressure monitoring system.

* * * * *